United States Patent
Schutt et al.

(10) Patent No.: US 11,351,867 B2
(45) Date of Patent: Jun. 7, 2022

(54) UNCOUPLED TRAILER POWER AND COMMUNICATION ARRANGEMENTS

(71) Applicant: SAF-HOLLAND, Inc., Muskegon, MI (US)

(72) Inventors: Randy L. Schutt, Holland, MI (US); Ahmad Nizam Mohamad Jembari, Grand Haven, MI (US); Thomas D. Stoll, Grand Rapids, MI (US)

(73) Assignee: SAF-Holland, Inc., Muskegon, MI (US)

( * ) Notice: Subject to any disclaimer, the term of this patent is extended or adjusted under 35 U.S.C. 154(b) by 255 days.

(21) Appl. No.: 16/247,988

(22) Filed: Jan. 15, 2019

(65) Prior Publication Data

US 2019/0217706 A1    Jul. 18, 2019

Related U.S. Application Data

(60) Provisional application No. 62/617,814, filed on Jan. 16, 2018.

(51) Int. Cl.
*G06F 7/00* (2006.01)
*B60L 1/02* (2006.01)
(Continued)

(52) U.S. Cl.
CPC ............... *B60L 1/02* (2013.01); *B60W 10/26* (2013.01); *G07C 5/02* (2013.01); *B60L 2200/36* (2013.01); *B60W 2300/145* (2013.01)

(58) Field of Classification Search
CPC ....... B60L 1/02; B60L 2200/36; B60W 10/26; B60W 2300/145; G07C 5/02; H02J 7/007; H02J 7/35; H02J 7/0052
(Continued)

(56) References Cited

U.S. PATENT DOCUMENTS 3,665,312 A    5/1972  Jarvis
5,917,433 A    6/1999  Keillor et al.
(Continued)

FOREIGN PATENT DOCUMENTS

WO    2005119614 A2    12/2005

OTHER PUBLICATIONS

IP.com Search.*
The Hague; Supplementary European Search Report; dated Feb. 1, 2021.

*Primary Examiner* — Mahmoud S Ismail
(74) *Attorney, Agent, or Firm* — Price Heneveld LLP

(57) ABSTRACT

A vehicle electrical power supply arrangement includes a towing vehicle, a primary power supply source position within the towed vehicle, a towed vehicle operably coupled to the towing vehicle for towing behind the towing vehicle, wherein the towed vehicle is configured to be electrically coupled and uncoupled from the towing vehicle, an auxiliary power supply source positioned within the towed vehicle and configured to store an electronic charge, a sensor arrangement attached to the towed vehicle and configured to monitor a vehicle operating parameter, and an electronic control unit operably coupled to the sensor arrangement, wherein the electronic control unit is configured to receive an electrical charge from at least one of the primary power source and the auxiliary power source when the towed vehicle is electrically coupled to the towing vehicle, and from the auxiliary power source when the towed vehicle is electrically uncoupled from the towing vehicle.

24 Claims, 3 Drawing Sheets

(51) Int. Cl.
*B60W 10/26* (2006.01)
*G07C 5/02* (2006.01)

(58) Field of Classification Search
USPC .......................................................... 701/36
See application file for complete search history.

(56) References Cited

U.S. PATENT DOCUMENTS

| | | | |
|---|---|---|---|
| 6,519,529 B2 | 2/2003 | Doyle | |
| 6,687,609 B2 | 2/2004 | Hsiao et al. | |
| 6,697,735 B2 | 2/2004 | Doyle | |
| 6,737,962 B2 | 5/2004 | Mayor | |
| 6,844,829 B2 | 1/2005 | Mayor | |
| 6,990,336 B2 | 1/2006 | Parisi | |
| 7,024,321 B1 | 4/2006 | Deninger et al. | |
| 7,053,823 B2 | 5/2006 | Cervinka et al. | |
| 7,135,976 B2 | 11/2006 | Neff et al. | |
| 7,242,322 B2 | 7/2007 | Neher et al. | |
| 7,327,250 B2 | 2/2008 | Harvey | |
| 7,339,460 B2 | 3/2008 | Lane et al. | |
| 7,427,918 B2 | 9/2008 | Fano | |
| 7,457,693 B2 | 11/2008 | Olsen et al. | |
| 7,492,255 B1 | 2/2009 | Morris | |
| 7,586,401 B2 | 9/2009 | Payne | |
| 7,612,668 B2 | 11/2009 | Harvey | |
| 7,784,707 B2 | 8/2010 | Witty et al. | |
| 7,834,757 B2 | 11/2010 | Rodgers et al. | |
| 8,004,242 B1 | 8/2011 | Purkey et al. | |
| 8,115,608 B2 | 2/2012 | Davis et al. | |
| 8,159,338 B2 | 4/2012 | Breed | |
| 8,232,871 B2 | 7/2012 | Leseky | |
| 8,354,927 B2 | 1/2013 | Breed | |
| 8,427,290 B2 | 4/2013 | Davis et al. | |
| 8,502,661 B2 | 8/2013 | Mauro et al. | |
| 8,717,163 B2 | 5/2014 | Easley et al. | |
| 8,760,274 B2 | 6/2014 | Boling et al. | |
| 8,779,948 B2 | 7/2014 | Faus et al. | |
| 8,885,046 B1 | 11/2014 | Foster | |
| 9,007,205 B2 | 4/2015 | Walker et al. | |
| 2004/0095227 A1 | 5/2004 | Lehman | |
| 2005/0261832 A1 | 11/2005 | Arnouse | |
| 2006/0036883 A1* | 2/2006 | Hashizumi | B60L 1/003 713/300 |
| 2008/0094209 A1 | 4/2008 | Braun | |
| 2008/0272906 A1 | 11/2008 | Breed | |
| 2009/0061897 A1 | 3/2009 | Hamilton et al. | |
| 2010/0065344 A1* | 3/2010 | Collings, III | B60W 10/26 180/2.1 |
| 2011/0094807 A1 | 4/2011 | Pruitt et al. | |
| 2011/0114398 A1 | 5/2011 | Bianco | |
| 2013/0257145 A1 | 10/2013 | Caldeira et al. | |
| 2013/0328703 A1 | 12/2013 | Doyle, III | |
| 2014/0062061 A1* | 3/2014 | Gettings | B62D 53/061 280/423.1 |
| 2014/0116077 A1* | 5/2014 | Pierce | B60L 1/02 62/235.1 |
| 2015/0194044 A1 | 7/2015 | Adams et al. | |
| 2015/0217727 A1 | 8/2015 | Walker et al. | |
| 2015/0353036 A1 | 12/2015 | Pierce et al. | |
| 2017/0063104 A1* | 3/2017 | Bean | H02J 7/007 |
| 2017/0098954 A1* | 4/2017 | Ferguson | H02J 7/025 |
| 2019/0016231 A1* | 1/2019 | Scaringe | B60L 1/003 |
| 2019/0054951 A1* | 2/2019 | Sugiyama | B60W 10/20 |
| 2020/0298672 A1* | 9/2020 | Yasar | B60H 1/00657 |

* cited by examiner

US 11,351,867 B2

UNCOUPLED TRAILER POWER AND COMMUNICATION ARRANGEMENTS

CROSS-REFERENCE TO RELATED APPLICATIONS

This application claims the benefit of U.S. Provisional Patent Application No. 62/617,814, filed on Jan. 16, 2018, entitled "UNCOUPLED TRAILER POWER AND COMMUNICATION ARRANGEMENTS," the entire disclosure of which is incorporated herein by reference.

BACKGROUND OF THE INVENTION

The present embodiments relate to an uncoupled trailer power and communication arrangement, and in particular to an auxiliary power arrangement for powering an electronic control module and a sensor arrangement configured to monitor vehicle parameters when the trailer is uncoupled from an associated towing vehicle.

BRIEF SUMMARY

One embodiment includes a vehicle electrical power supply arrangement that includes a towing vehicle, a primary power supply source position within the towed vehicle, and a towed vehicle operably coupled to the towing vehicle for towing behind the towing vehicle, wherein the towed vehicle is configured to be electrically coupled and uncoupled from the towing vehicle, and an auxiliary power supply source positioned within the towed vehicle and configured to store an electronic charge. The embodiment further includes a sensor arrangement attached to the towed vehicle and configured to monitor a vehicle operating parameter, and an electronic control unit operably coupled to the sensor arrangement, wherein the electronic control unit is configured to receive an electrical charge from at least one of the primary power source and the auxiliary power source when the towed vehicle is electrically coupled to the towing vehicle, and from the auxiliary power source when the towed vehicle is electrically uncoupled from the towing vehicle.

Another embodiment includes a vehicle electrical power supply arrangement that includes a semi-truck, a battery positioned within the towed semi-truck, a semi-trailer operably coupled to the towing semi-truck for towing behind the semi-truck, wherein the semi-trailer is configured to be electrically coupled and uncoupled from the semi-truck, and an auxiliary power supply source positioned within the semi-trailer and configured to store an electronic charge. The embodiment further includes a sensor arrangement attached to the semi-trailer and configured to monitor a vehicle operating parameter, and an electronic control unit operably coupled to the sensor arrangement, wherein the electronic control unit is configured to receive an electrical charge from at least one of the primary power source and the auxiliary power source when the semi-trailer is electrically coupled to the semi-truck, and from the auxiliary power source when the semi-trailer is electrically uncoupled from the semi-truck.

The embodiments as shown and described herein provide an auxiliary power unit that provides power to an electronic control unit and/or a vehicle parameter sensor arrangement, when the vehicle, the electronic control unit and sensor array is uncoupled from a towing vehicle, wherein the towing vehicle includes a primary source of power configured to power the ECU and sensor array when the towed vehicle is coupled to the towing vehicle, thereby providing power to the ECU to allow the backup of information and vehicle parameters to a non-volatile memory of the ECU, collecting and storing data from the sensor array, such as scales, relative location of the vehicle, accelerometers, and the like during an uncoupled state. The embodiments of the vehicle electrical power supply arrangement as disclosed herein may also be configured to provide power to a communication device that allows communication of the vehicle parameters with a remote location, such as a central vehicle control or dispatch center.

These and other advantages of the embodiments as disclosed herein will be further understood and appreciated by those skilled in the art by reference to the following written specification, claims and appended drawings.

DETAILED DESCRIPTION OF THE PREFERRED EMBODIMENTS

Figure 1:
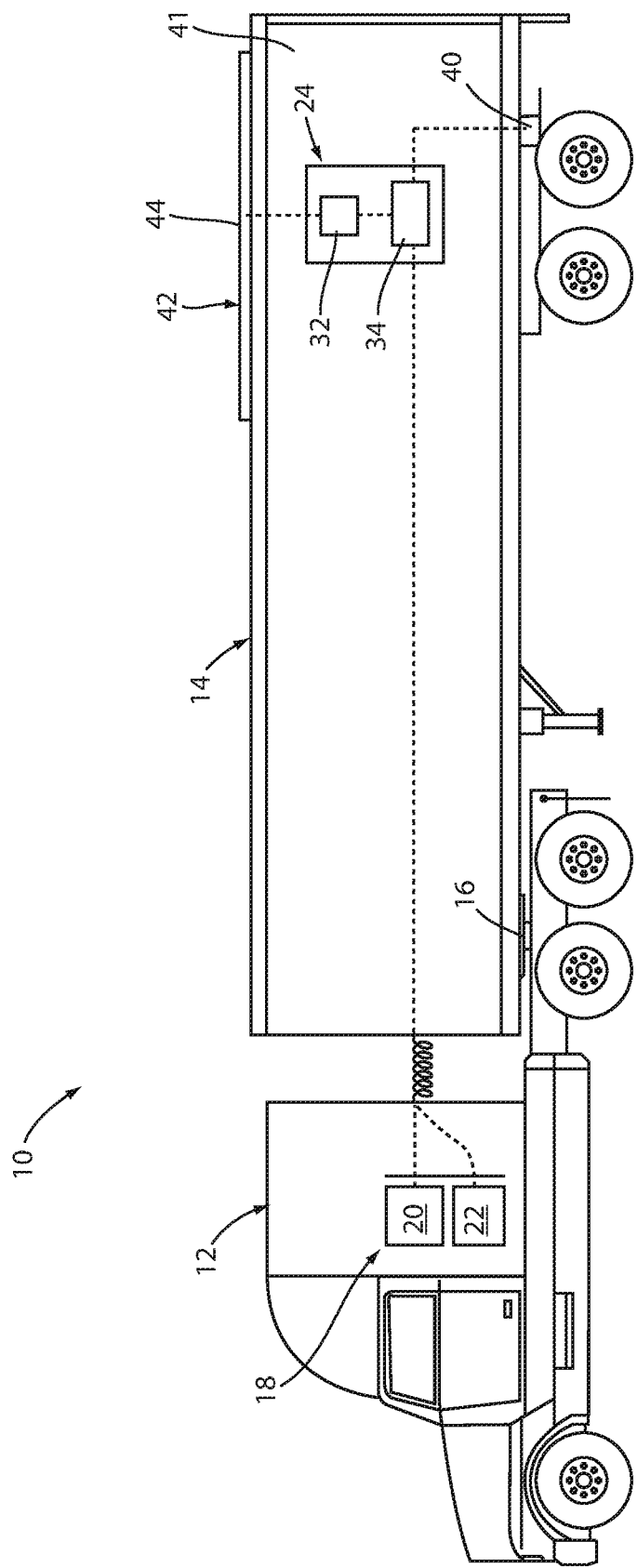
FIG. 1 is a schematic side elevational view of a vehicle arrangement.

For purposes of description herein, the terms "upper," "lower," "right," "left," "rear," "front," "vertical," "horizontal," and the embodiments thereof shall relate to the invention as oriented in FIG. 1. However, it is to be understood that the various embodiments as shown and described herein may assume various alternative orientations, except where expressly specified to the contrary. It is also to be understood that the specific devices and processes illustrated in the attached drawings, and described in the following specification are simply exemplary embodiments of the concepts defined in the appended claims. Hence, specific dimensions and other characteristics relating to the embodiments disclosed herein are not to be considered as limiting, unless the claims expressly state otherwise.

The reference numeral 10 (FIG. 1) generally designates a vehicle arrangement in the form of a heavy-duty tractor and trailer combination, wherein a semi-truck or tractor 12 represents a towing vehicle that operationally supports an associated trailer 14 representing a towed vehicle. The trailer 14 is coupled to the truck 12 via a fifth wheel hitch assembly 16 in a manner as well known in the art. The truck 12 includes a primary power supply source 18 that may include a battery 20 and/or an alternator 22.

Figure 2:
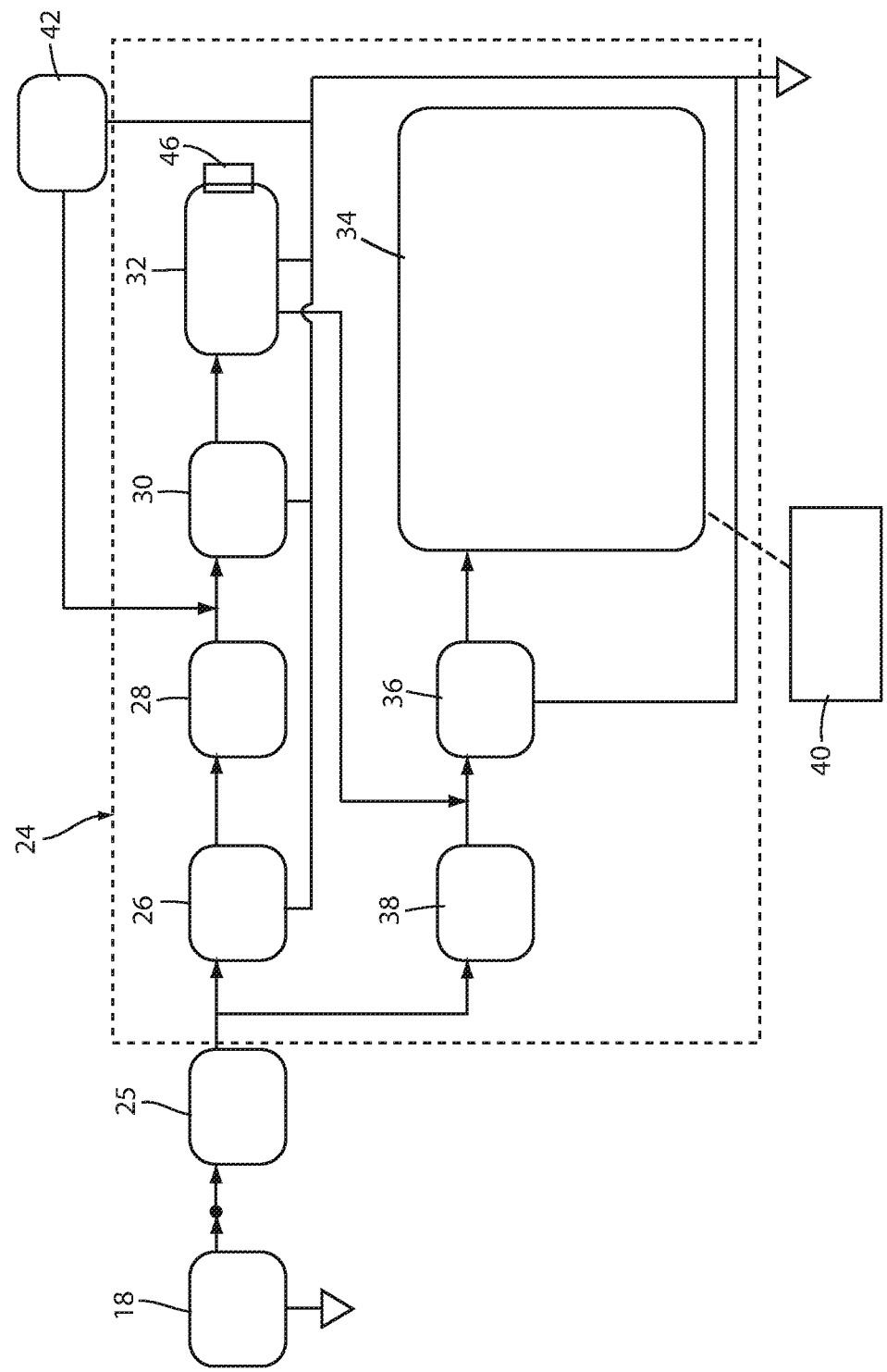
FIG. 2 is a schematic view of a trailer electronic control unit backup power arrangement, wherein the backup power arrangement is coupled to a primary power supply source.
Figure 3:
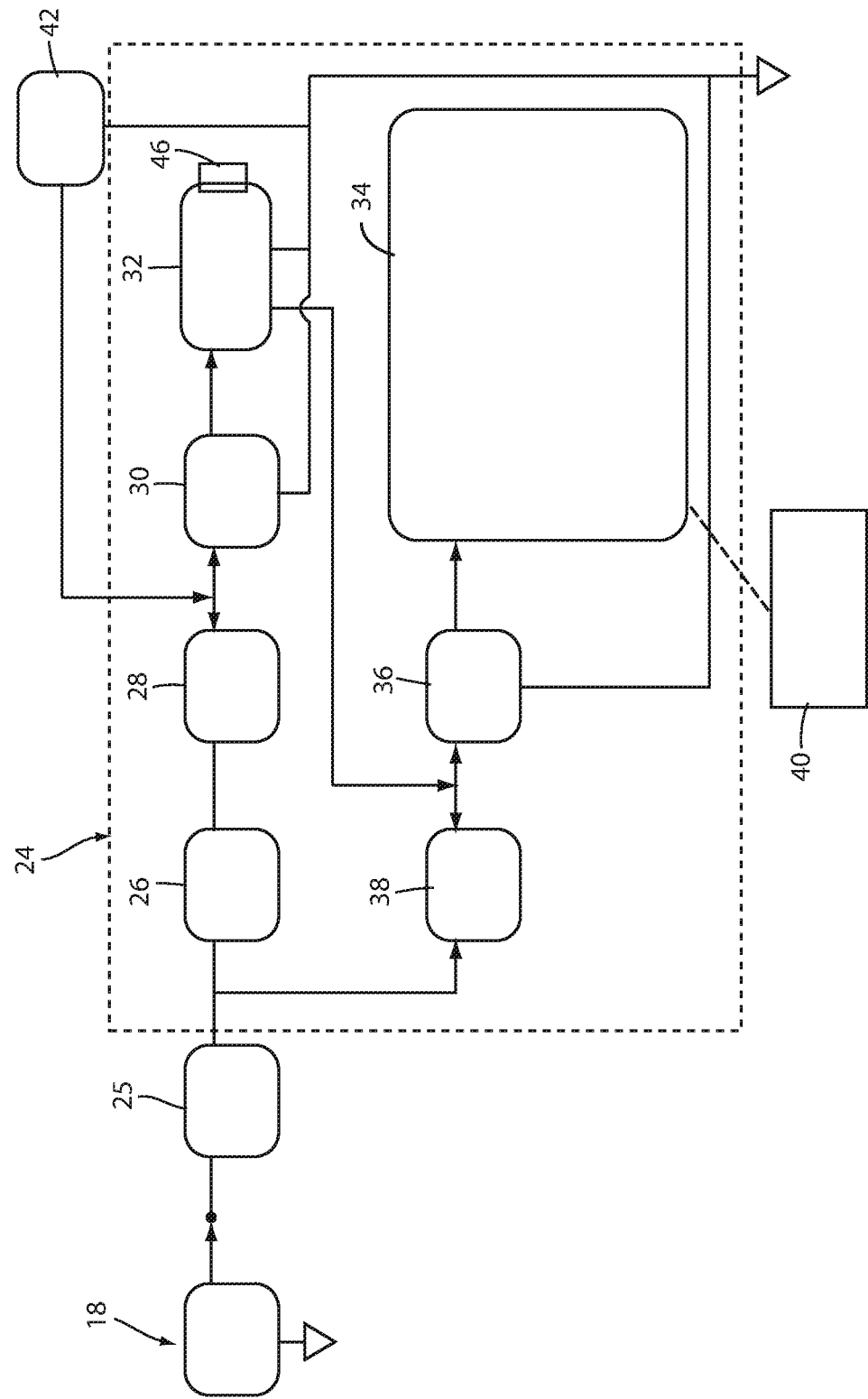
FIG. 3 is a schematic view of the trailer electronic control unit backup power arrangement where the power arrangement is disconnected from the primary power supply source.

The trailer electronic control unit backup power arrangement 24 may be coupled with the primary power supply source 18, as shown in FIG. 2, or uncoupled from the primary power supply source 18, as shown in FIG. 3. The trailer electronic control backup power arrangement 24 includes a voltage regulator 26, a diode arrangement 28, and a charging controller 30 that regulates the rate and amount of charge provided to an auxiliary power supply source 32, where the trailer electronic control backup power arrangement is separated from the primary power supply source 18 by a fuse 25. The auxiliary power supply source 32 may include a rechargeable battery and/or a super capacitor. The auxiliary power supply source 32 is connected to an electronic control unit 34 via a voltage regulator 36.

During operation, when the trailer 14 is electrically coupled with the truck 12, the primary power supply source 18 may provide electrical power to the auxiliary power supply source 32 via the voltage regulator 26, the diode arrangement 28, and the charging controller 30, and to the electronic control unit 34 via a diode 38 and the voltage regulator 36. When the trailer 14 is electrically uncoupled from the truck 12 the auxiliary power supply source 32 and the electronic control unit 34 cannot receive power from the primary power supply source 18. In this configuration, power is supplied to the electronic control unit 34 via the auxiliary power supply source 32.

The electronic control unit 34 of the trailer electronic control unit backup power arrangement 24 may be operably coupled to a vehicle parameter sensor 40 configured to collect data from a trailer 14 and the associated components thereof, including parameters such as overall vehicle weight, weight exerted on certain components of the suspension arrangement such as the axle member, GPS and vehicle location, accelerometers and strain gauges, temperature gauges monitoring the temperature of the cargo area of the trailer 14, temperature gauges monitoring the temperature of the auxiliary power supply source, and the like. The sensor or sensors 40 may be hardwired to the electronic control unit 34 or connected to the electronic control unit 34 via wireless communication protocols, such as Bluetooth®, ZigBee, and the like. Additional information may also be sensed or monitored and stored within the ECU, such as trailer type, the number of axles associated with the trailer, the position of the axles, the weight distribution on each of the axles for the particular location of the axles along the length of the associated trailer frame assembly, the product contained within the cargo area 41, and the like. The auxiliary power supply source 32 supplies power to the electronic control unit 34 such that the data collected by the electronic control unit 34 may be communicated with locations remote from the trailer 14, such as central dispatch and fleet control facilities.

In an alternative embodiment, an alternative charging arrangement 42 may be utilized to supply power to the auxiliary power supply source 32 and/or the electronic control unit 34 either in place of or in supplement to power supplied by the primary power supply source 18. In the illustrated example, the alternative charging arrangement 42 includes a solar cell 44, however, other alternative charging arrangements may also be used, including, but not limited to, kinetic energy harvesters.

In another alternative embodiment, the trailer electronic control unit backup power arrangement 24 includes a heating arrangement 46 configured to maintain a temperature of the auxiliary power supply source 32 at a preselected temperature. This temperature would typically be set by the battery or capacitor manufacturer. In the illustrated example, the heating arrangement 46 includes a resistance heating element, however, other heating arrangements may be utilized including Peltier devices, controlled exothermic chemical reactors, and/or super insulating containers.

The vehicle electrical power supply arrangement as disclosed and described herein provide an auxiliary power unit that provides power to an electronic control unit and/or a vehicle parameter sensor arrangement, when the vehicle, the electronic control unit and sensor array is uncoupled from a towing vehicle, wherein the towing vehicle includes a primary source of power configured to power the ECU and sensor array when the towed vehicle is coupled to the towing vehicle, thereby providing power to the ECU to allow the backup of information and vehicle parameters to a non-volatile memory of the ECU, collecting and storing data from the sensor array, such as scales, relative location of the vehicle, accelerometers, and the like during an uncoupled state. The embodiments of the vehicle electrical power supply arrangement as disclosed herein may also be configured to provide power to a communication device that allows communication of the vehicle parameters with a remote location, such as a central vehicle control or dispatch center.

In the foregoing discussion, it will be readily appreciated by those skilled in the art that modifications may be made to the embodiments as disclosed herein without departing from the concepts as disclosed herein. Such modifications are to be considered as included in the following claims, unless these claims by their language expressly state otherwise.

The invention claimed is:

1. A vehicle electrical power supply arrangement, comprising:
   a towing vehicle;
   a primary power supply source positioned within the towing vehicle;
   a towed vehicle operably coupled to the towing vehicle for towing behind the towing vehicle, wherein the towed vehicle is configured to be electrically coupled and uncoupled from the towing vehicle;
   an auxiliary power supply source positioned within the towed vehicle and configured to store an electronic charge;
   a sensor arrangement attached to the towed vehicle and configured to monitor a vehicle operating parameter of the towed vehicle while the towed vehicle is disconnected from the towing vehicle; and
   an electronic control unit operably coupled to the sensor arrangement to receive a signal from the sensor relating to the vehicle operating parameter, wherein the electronic control unit is configured to receive an electrical charge from at least one of the primary power source and the auxiliary power source when the towed vehicle is electrically coupled to the towing vehicle, and from the auxiliary power source when the towed vehicle is electrically uncoupled from the towing vehicle, such that the electronic control unit is configured to receive the signal from the sensor arrangement when the towed vehicle is electronically uncoupled from the towing vehicle.

2. The vehicle electrical power supply arrangement of claim 1, wherein the primary power supply includes a battery.

3. The vehicle electrical power supply arrangement of claim 1, wherein the auxiliary power supply source includes a battery.

4. The vehicle electrical power supply arrangement of claim 1, wherein the auxiliary power supply source includes a capacitor.

5. The vehicle electrical power supply arrangement of claim 1, further comprising:
   an auxiliary charging arrangement electrically coupled with the auxiliary power supply and configured to provide an electronic charge to the auxiliary power supply.

6. The vehicle electrical power supply arrangement of claim 5, wherein the auxiliary charging arrangement includes at least one solar cell.

7. The vehicle electrical power supply arrangement of claim 1, wherein the towing vehicle includes a semi-truck.

8. The vehicle electrical power supply arrangement of claim 7, wherein the towed vehicle includes a semi-trailer.

9. The vehicle electrical power supply arrangement of claim 1, wherein the vehicle operating parameter includes a temperature of a cargo area.

10. The vehicle electrical power supply arrangement of claim 1, further comprising:
a heating arrangement configured to maintain the auxiliary power supply source at a preselected temperature.

11. The vehicle electrical power supply arrangement of claim 10, wherein the heating arrangement includes a resistance heating element.

12. The vehicle electrical power supply arrangement of claim 1, wherein the vehicle operating parameter includes a weight exerted on a component of a suspension of the towed vehicle.

13. The vehicle electrical power supply arrangement of claim 1, wherein the vehicle operating parameter includes an acceleration of a component of the towed vehicle.

14. The vehicle electrical power supply arrangement of claim 1, wherein the vehicle operating parameter includes a strain of a component of the towed vehicle.

15. The vehicle electrical power supply arrangement of claim 1, wherein the vehicle operating parameter includes a temperature of the auxiliary power source.

16. The vehicle electrical power supply arrangement of claim 1, wherein the vehicle operating parameter includes a weight of a towed vehicle.

17. A vehicle electrical power supply arrangement, comprising:
a semi-truck;
a battery positioned within the semi-truck;
a semi-trailer operably coupled to the semi-truck for towing behind the semi-truck, wherein the semi-trailer is configured to be electrically coupled and uncoupled from the semi-truck;
an auxiliary power supply source positioned within the semi-trailer and configured to store an electronic charge;
a sensor arrangement attached to the semi-trailer and configured to monitor a vehicle operating parameter while the semi-trailer is disconnected from the semi-truck including at least one of a weight of the semi-trailer, weight exerted on a component of a suspension of the semi-trailer, acceleration of a component of the semi-trailer, strain of a component of the semi-trailer, and temperature of the auxiliary power source; and
an electronic control unit operably coupled to the sensor arrangement to receive a signal from the sensor related to the vehicle operating parameter, wherein the electronic control unit is configured to receive an electrical charge from at least one of the primary power source and the auxiliary power source when the semi-trailer is electrically coupled to the semi-truck, and from the auxiliary power source when the semi-trailer is electrically uncoupled from the semi-truck, such that the electronic control unit is configured to receive the signal from the sensor when the semi-trailer is uncoupled from the semi-truck.

18. The vehicle electrical power supply arrangement of claim 17, wherein the auxiliary power supply source includes a battery.

19. The vehicle electrical power supply arrangement of claim 17, wherein the auxiliary power supply source includes a capacitor.

20. The vehicle electrical power supply arrangement of claim 17, further comprising:
an auxiliary charging arrangement electrically coupled with the auxiliary power supply and configured to provide an electronic charge to the auxiliary power supply.

21. The vehicle electrical power supply arrangement of claim 20, wherein the auxiliary charging arrangement includes at least one solar cell.

22. The vehicle electrical power supply arrangement of claim 17, wherein the vehicle operating parameter includes a temperature of a cargo area.

23. The vehicle electrical power supply arrangement of claim 17, further comprising:
a heating arrangement configured to maintain the auxiliary power supply source at a preselected temperature.

24. The vehicle electrical power supply arrangement of claim 23, wherein the heating arrangement includes a resistance heating element.

* * * * *